United States Patent
Sankaran et al.

(10) Patent No.: US 7,733,880 B2
(45) Date of Patent: Jun. 8, 2010

(54) MANAGING ROUTES IN A ROUTER UTILIZING THRESHOLD-SPECIFIC DISCARD ALGORITHMS

(75) Inventors: Krishna Sankaran, Sunnyvale, CA (US); Apurva Mehta, Cupertino, CA (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 1868 days.

(21) Appl. No.: 10/222,125

(22) Filed: Aug. 16, 2002

(65) Prior Publication Data
US 2003/0231587 A1 Dec. 18, 2003

Related U.S. Application Data

(60) Provisional application No. 60/389,069, filed on Jun. 14, 2002.

(51) Int. Cl.
- H04L 12/56 (2006.01)
- G06F 15/173 (2006.01)
- G06F 17/00 (2006.01)

(52) U.S. Cl. .................. 370/400; 709/238; 707/100

(58) Field of Classification Search .......... 370/216, 370/227, 228, 252, 400, 229–232, 253, 389, 370/401, 412, 413, 415, 417; 709/220–222, 709/238–244; 707/100, 101, 205, 206
See application file for complete search history.

(56) References Cited

U.S. PATENT DOCUMENTS

| | | | | |
|---|---|---|---|---|
| 6,269,364 B1 * | 7/2001 | Kennedy et al. | | 707/5 |
| 6,385,170 B1 * | 5/2002 | Chiu et al. | | 370/235 |
| 6,385,649 B1 * | 5/2002 | Draves et al. | | 709/224 |
| 6,732,111 B2 * | 5/2004 | Brodersen et al. | | 707/101 |
| 6,791,949 B1 * | 9/2004 | Ryu et al. | | 370/254 |
| 6,904,462 B1 * | 6/2005 | Sinha | | 709/226 |
| 6,934,249 B1 * | 8/2005 | Bertin et al. | | 370/218 |
| 7,489,632 B2 * | 2/2009 | Lakkakorpi | | 370/231 |
| 2002/0018474 A1 * | 2/2002 | Assa et al. | | 370/412 |

OTHER PUBLICATIONS

BGP Prefix-Based Outbound Route Filtering, Cisco Systems, Inc., Cisco IOS Release 12.0(11)ST, Jul. 2000.

* cited by examiner

Primary Examiner—Aung S Moe
Assistant Examiner—Kerri M Rose
(74) Attorney, Agent, or Firm—Wilson & Ham (57) ABSTRACT

Managing routes in a router involves the implementation of threshold-specific discard algorithms to discard redundant routes in an intelligent fashion based upon the volume of routes in the router. By employing threshold-specific discard algorithms to intelligently discard redundant routes within a router, the storage capacity of the router is utilized in a more efficient fashion because the routes are not dropped indiscriminately. A method and system comprise identifying a volume of routes in the router, determining whether the volume of routes has reached a threshold and applying a threshold-specific discard algorithm to routes in the router if the volume of routes has reached the threshold.

52 Claims, 7 Drawing Sheets

Destination A Routes

Route A.1 = 12, 27
    Route A.2 = 12, 25, 57
    Route A.3 = 13, 35, 57

•
    •
    •

Route A.N = ..............

Destination B Routes

Route B.1 = 14, 48
    Route B.2 = 14, 46, 68
    Route B.3 = 13, 36, 68
    Route B.4 = 12, 25, 56, 68

•
    •
    •

Route B.N = ..............

MANAGING ROUTES IN A ROUTER UTILIZING THRESHOLD-SPECIFIC DISCARD ALGORITHMS

CROSS-REFERENCE TO RELATED APPLICATION

This application is entitled to the benefit of provisional U.S. Patent Application Ser. No. 60/389,069, filed Jun. 14, 2002.

FIELD OF THE INVENTION

The present invention relates generally to computer networks and more specifically to techniques for discarding routes from a router.

BACKGROUND OF THE INVENTION

The Internet includes a network of interconnected routers that route customer data packets over one or more links between a source Internet Protocol (IP) address and a destination IP address. Successful routing of customer data packets requires that a logical path (i.e., a collection of one or more links) exist in the network between the source IP address and destination IP address for that packet. Based on the contents of its routing table, each router along the path determines the best hop on which to send each packet in order to deliver the packets to the ultimate destination. Assuming the network possesses sufficient physical redundancy (e.g., multiple routers, multiple links), the network can dynamically redefine paths using protocols such as the Border Gateway Protocol (BGP) or Open Shortest Path First (OSPF) protocol, in case of a router or link failure. The use of such protocols ensures that no one router or link failure disrupts the flow of packets between a source IP address and destination IP address.

Figure 1:
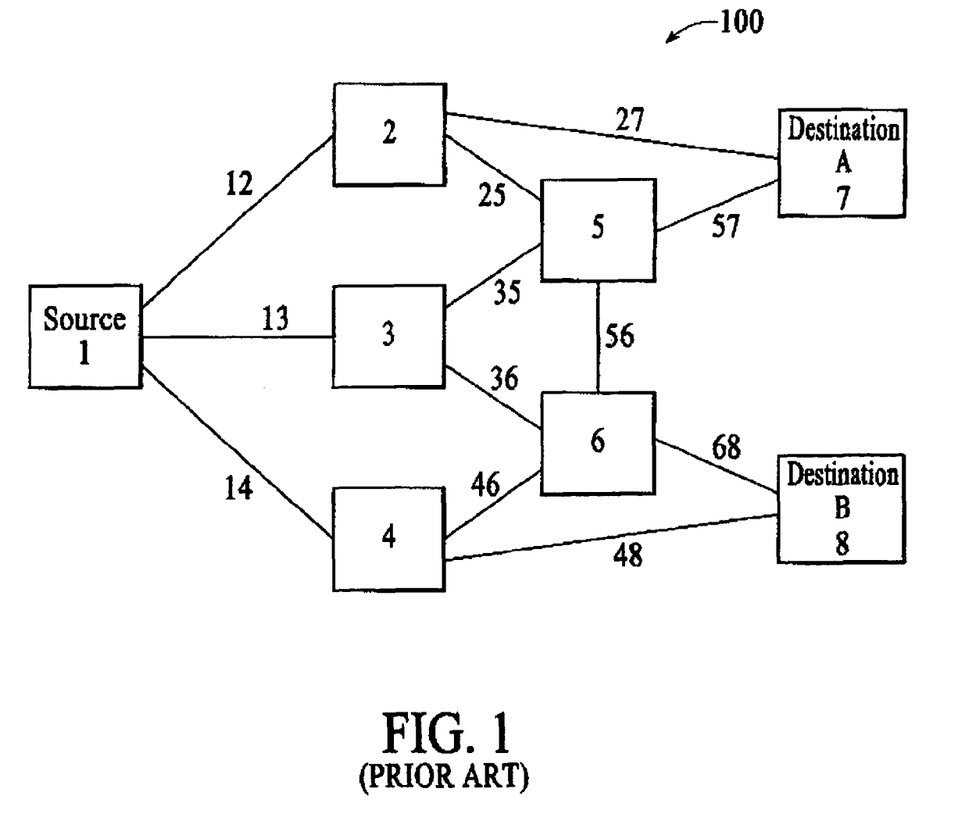
FIG. 1 depicts an example of a routing network.

FIG. 1 depicts an example network 100 of routers. The network 100 includes eight different routers (identified as routers 1-8) that are interconnected through various links. For exemplary purposes, router 1 is identified as a source router and routers 7 and 8 are identified as destination routers, routers A and B respectively. As depicted in FIG. 1, traffic from the source router 1 can reach the destination routers through many different routes. That is, the path between the source router and the destination routers include multiple redundant routes. Redundant routes are different routes that have the same source and destination. As is known in the field of IP networks, the routers employ route tables to keep track of the plurality of different routes that are available to reach a destination IP address from a particular router. For example, source router 1 utilizes a route table to track the available routes to the two destination routers 7 and 8.

When redundant routes exist for a given destination, some routes are preferred over other routes. For example, route preference may be based on the numbers of hops (other routers) that are required between the source and the destination or on an amount of bandwidth available on the links along the route. In FIG. 1, the numbers next to the logical paths connecting the routers indicate the number of hops between the depicted routers. As one example, a data packet makes 12 hops to travel from router 1 to router 2. Often times, redundant routes are stored in a route table in a preferential order, e.g. the most preferred route is stored first, the next most preferred route is stored second, etc.

Figure 2:
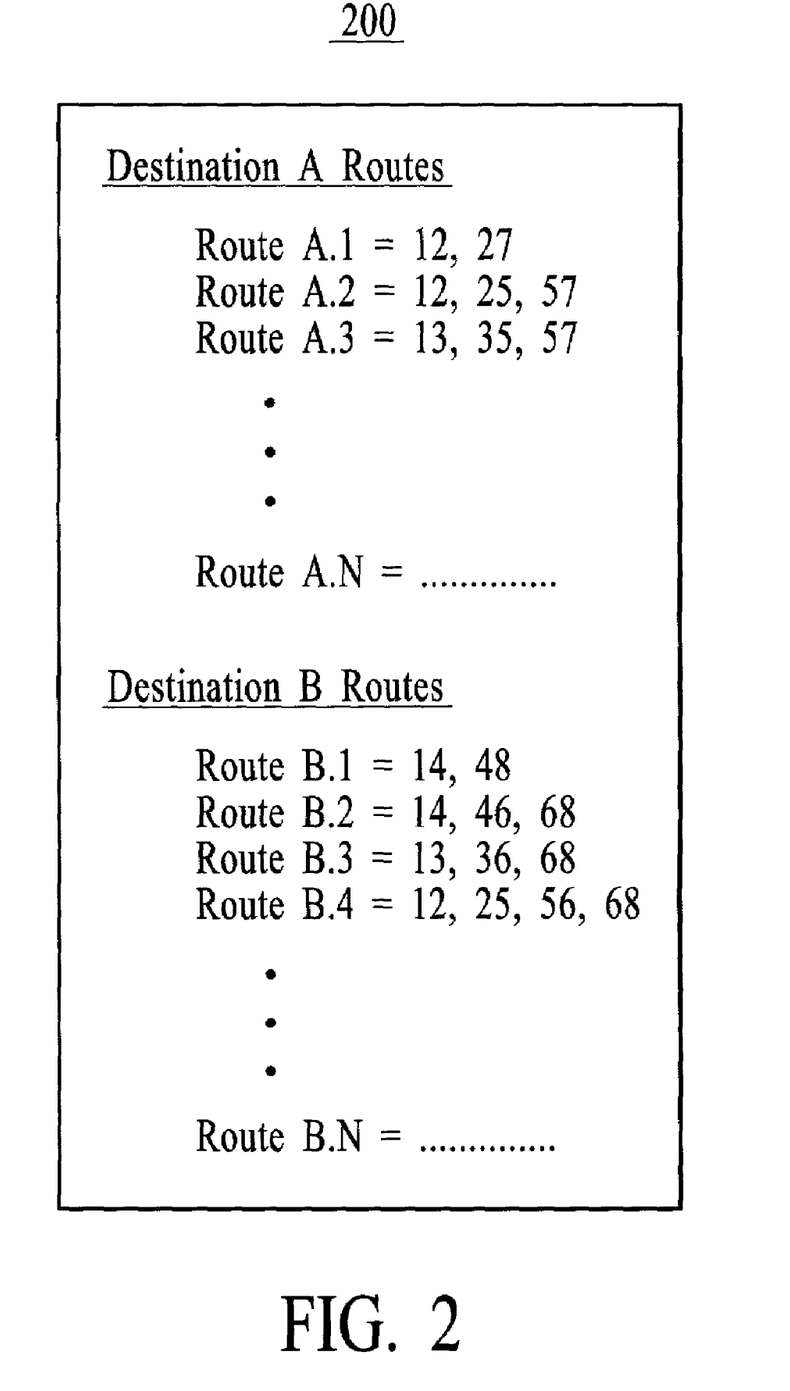
FIG. 2 depicts an example of a route table.

FIG. 2 depicts a conventional routing table 200. Referring to FIG. 1 in conjunction with FIG. 2, the route table 200 stores example routes from the source to destination A and destination B. In the example, the routes to Destination A include Routes A.1, A.2, A.3 ... A.N where N is an integer value of the Nth route available to Destination A. Similarly, the routes to Destination B include Routes B.1, B.2, B.3, B.4 ... B.N.

Figure 3:
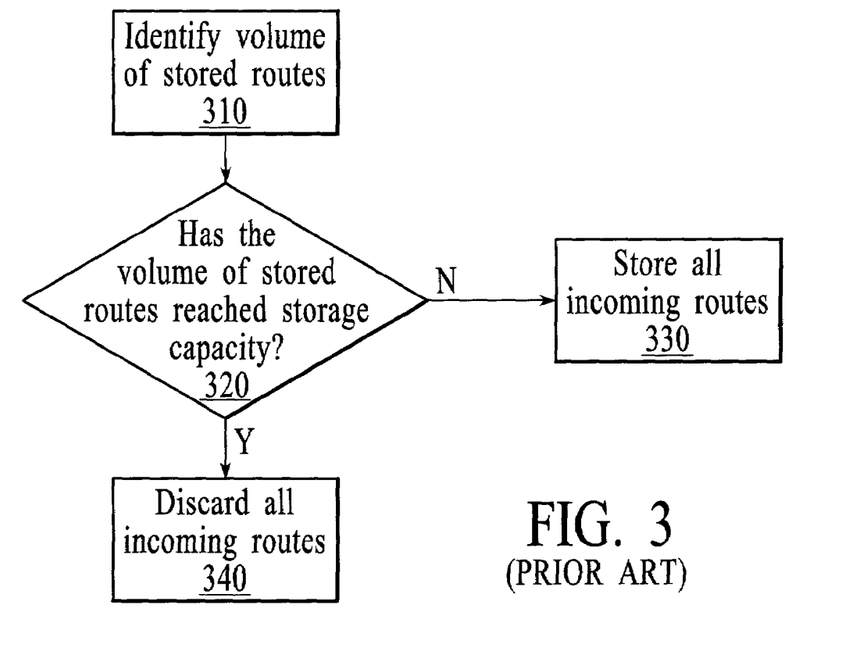
FIG. 3 depicts a flowchart of a prior art technique for managing routes in a router.

Conventional route tables are responsible for storing thousands, sometimes tens of thousands of routes. Because the storage capacity of the route table is limited, once the router reaches it's storage capacity, the router can become overloaded with routes thereby causing new routes to be dropped indiscriminately. FIG. 3 depicts a flowchart of a conventional scheme for managing routes. First, at block 310 a volume of stored routes is identified in the router. Next, at block 320, a determination is made as to whether the volume of stored routes has reached the storage capacity of the router. If the volume of routes has not reached the storage capacity, all incoming routes are stored in the route table at block 330. If the volume of routes has reached the storage capacity, all incoming routes are discarded at block 340. That is, the routes are indiscriminately discarded without regard to the relative preference or the redundant nature of some of the routes. This is an extremely inefficient use of the router's limited storage capacity.

Therefore, what is needed is a method and system that addresses the above-described short-comings of the conventional methodology. The method and system should be simple, cost effective and capable of being easily adapted into existing technology. The present invention addresses such a need.

SUMMARY OF THE INVENTION

A method and system for managing routes in a router involves the implementation of threshold-specific discard algorithms to discard redundant routes in an intelligent fashion based upon the volume of routes in the router. By employing threshold-specific discard algorithms to intelligently discard redundant routes within a router, the storage capacity of the router is utilized in a more efficient fashion because the routes are not dropped indiscriminately.

An embodiment of the invention includes a method for managing routes in a router. The method comprises identifying a volume of routes in the router, determining whether the volume of routes has reached a threshold, and applying a threshold-specific discard algorithm to routes in the router if the volume of routes has reached the threshold.

In an embodiment of the method, applying a threshold-specific discard algorithm to routes in the router includes applying the threshold-specific discard algorithm to routes that are stored in a routing table.

In another embodiment of the method, applying a threshold-specific discard algorithm to routes in the router includes applying the threshold-specific discard algorithm to incoming routes.

Another embodiment of the invention includes a system for managing routes in a router. The system comprises means for identifying a volume of routes in the router, means for determining whether the volume of routes has reached a threshold, and means for applying a threshold-specific discard algorithm to routes in the router if the volume of routes has reached the threshold.

In an embodiment of the system, the means for applying a threshold-specific discard algorithm to routes in the router includes means for applying the threshold-specific discard algorithm to routes that are stored in a routing table.

In another embodiment of the system, the means for applying a threshold-specific discard algorithm to routes in the router includes means for applying the threshold-specific discard algorithm to incoming routes.

A third embodiment of the invention includes a router for use in a computer network. The router comprises a buffer, a routing table coupled to the buffer, and route discard logic coupled to the buffer and the route table wherein the route discard logic comprises logic for identifying a volume of routes in the router, for determining whether the volume of routes has reached a threshold and for applying a threshold-specific discard algorithm to routes in the router if the volume of routes has reached the threshold.

In an embodiment of the router, the logic for applying a threshold-specific discard algorithm to routes in the router includes logic for applying the threshold-specific discard algorithm to routes that are stored in a routing table.

In another embodiment of the router, the logic for applying a threshold-specific discard algorithm to routes in the router includes logic for applying the threshold-specific discard algorithm to incoming routes.

Other aspects and advantages of the present invention will become apparent from the following detailed description, taken in conjunction with the accompanying drawings, illustrating by way of example the principles of the invention.

DETAILED DESCRIPTION

A method and system for managing routes in a router involves the implementation of threshold-specific discard algorithms to discard redundant routes in an intelligent fashion based upon the volume of routes in the router. By employing threshold-specific discard algorithms to intelligently discard redundant routes within a router, the storage capacity of the router is utilized in a more efficient fashion because the routes are not dropped indiscriminately.

In an embodiment, applying a threshold-specific discard algorithm involves discarding routes from the router in an intelligent fashion once the volume of routes in the router reaches a predetermined threshold. The volume and corresponding threshold can be expressed using different metrics. For example, the volume and threshold can be expressed as a fraction of the storage capacity in the router or a number of routes being stored in the router. One of ordinary skill in the art will recognize that different router parameters could be employed while remaining within the spirit and scope of the present invention.

Figure 4:
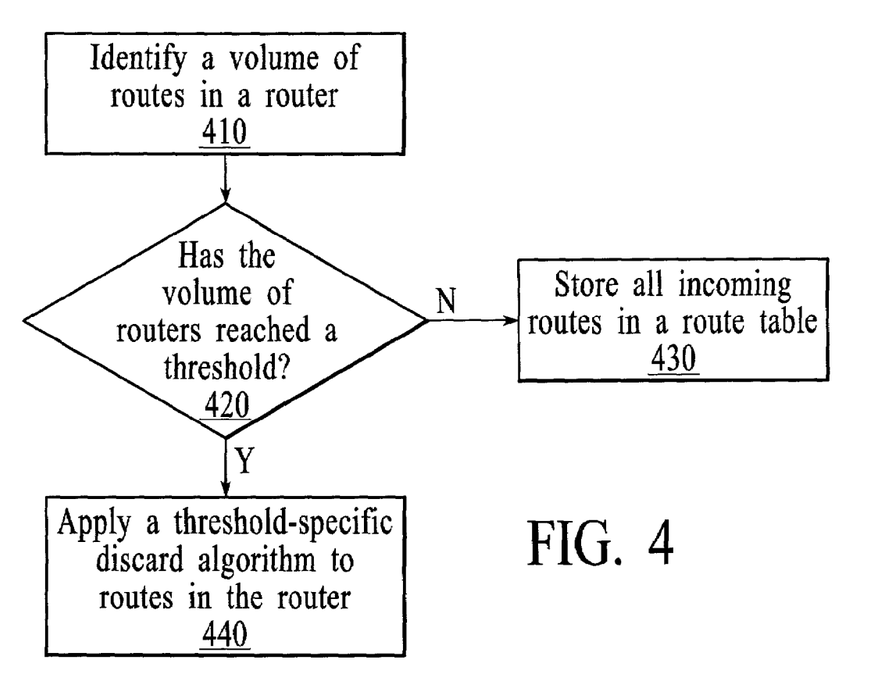
FIG. 4 depicts a flowchart of a method for managing routes in a router in accordance with an embodiment of the invention.

FIG. 4 depicts a flowchart of a method for managing routes in a router in accordance with an embodiment of the invention. At block 410, a volume of routes in a router is identified (i.e., a fraction of the storage capacity or a number of routers). At decision block 420, a determination is made as to whether the volume of routes has reached a threshold. At block 430, if the volume of routes has not reached the threshold, then all incoming routes are stored in a route table. At block 440, if the volume of routes has reached the threshold, then a threshold-specific discard algorithm is applied to routes in the router.

Figure 5:
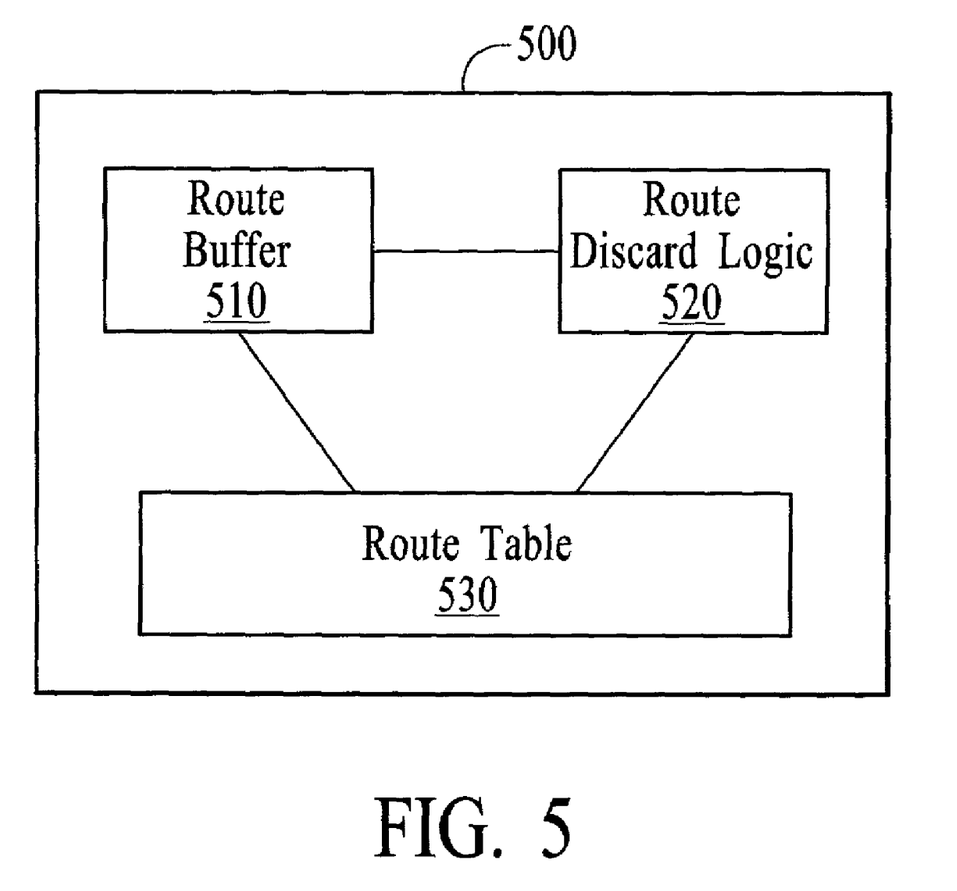
FIG. 5 depicts an embodiment of a router that includes a route buffer, a route table and route discard logic in accordance with an embodiment of the invention.

FIG. 5 depicts a router 500 in accordance with an embodiment of the invention. The router 500 includes a route buffer 510, route discard logic 520, and a route table 530. The route table 530, the route buffer 510 and the route discard logic 520 are functionally coupled to each other. The route buffer 510 temporarily stores incoming routes before the routes are stored in the route table 530. The route discard logic 520 monitors the volume of routes that are stored in the router 500 and implements a threshold-specific algorithm once the volume of routes in the router 500 reaches a predetermined threshold.

The route table 530 stores routes for use in packet routing. The route table 530 may include RAM and CAM. In an embodiment, a route may include a destination IP address, a next hop IP address, age information, preference information, metric information, any associated labels, an AS path, state information, or any combination thereof.

As previously mentioned, the implementation of the threshold-specific discard algorithm is triggered once the volume of routes in the router 500 reaches a predetermined threshold. The volume of routes could be the volume of routes being stored in the route buffer 510, the volume of routes in the route table 530, or a combination of both. In an embodiment, the route discard logic 520 could be configured to initiate the threshold-specific discard algorithm when the volume of routes in the route buffer 510 reaches a particular number of routes (100K, 90K, 80K, etc.) or when the number of routes in the route table 530 reaches a particular number. That is, in an embodiment, the volume of routes is expressed as the number of stored routes.

In another embodiment, the route discard logic 520 is configured to initiate the threshold-specific discard algorithm when the volume of routes stored in the router 500 reaches a predetermined fraction of the router storage capacity (e.g. 90%, 80% or 70% of the storage capacity). That is, in an embodiment, the volume of routes is expressed as a fraction of the storage capacity. The storage capacity of the router 500 could be the storage capacity of the route table 530 or a combination of the storage capacity of the route table 530 and the storage capacity of the route buffer 510.

In accordance with an embodiment of the invention, the term "threshold-specific" means that different thresholds trigger different discard algorithms. For instance, once a threshold (e.g. a first threshold) is reached, a threshold-specific discard algorithm is applied. Accordingly, once another threshold (e.g. a second threshold) is reached, another threshold-specific discard algorithm is applied. For example, utilizing a fraction of the storage capacity of router 500 as the threshold parameter, once the volume of stored routes reaches a first threshold amount, for example 75% of the storage capacity, a first threshold-specific discard algorithm is applied to the routes in the router 500. That is, routes in the router are processed in accordance with the first threshold-specific discard algorithm. Once the volume of stored routes reaches a second threshold amount, for example 80% of the storage capacity, a second threshold-specific discard algorithm is applied to the routes in the router 500. In an embodiment of the invention, the second threshold-specific discard algorithm is more restrictive than the first threshold-specific discard algorithm since the second threshold measurement is higher than the first threshold measurement. For example, the more restrictive threshold-specific discard algorithm allows fewer redundant routes to be stored in the route table.

Although the above-described embodiment only discloses two thresholds, one of ordinary skill in the art will readily recognize that any number of thresholds can be utilized while remaining within the spirit and scope of the present invention.

Figure 6:
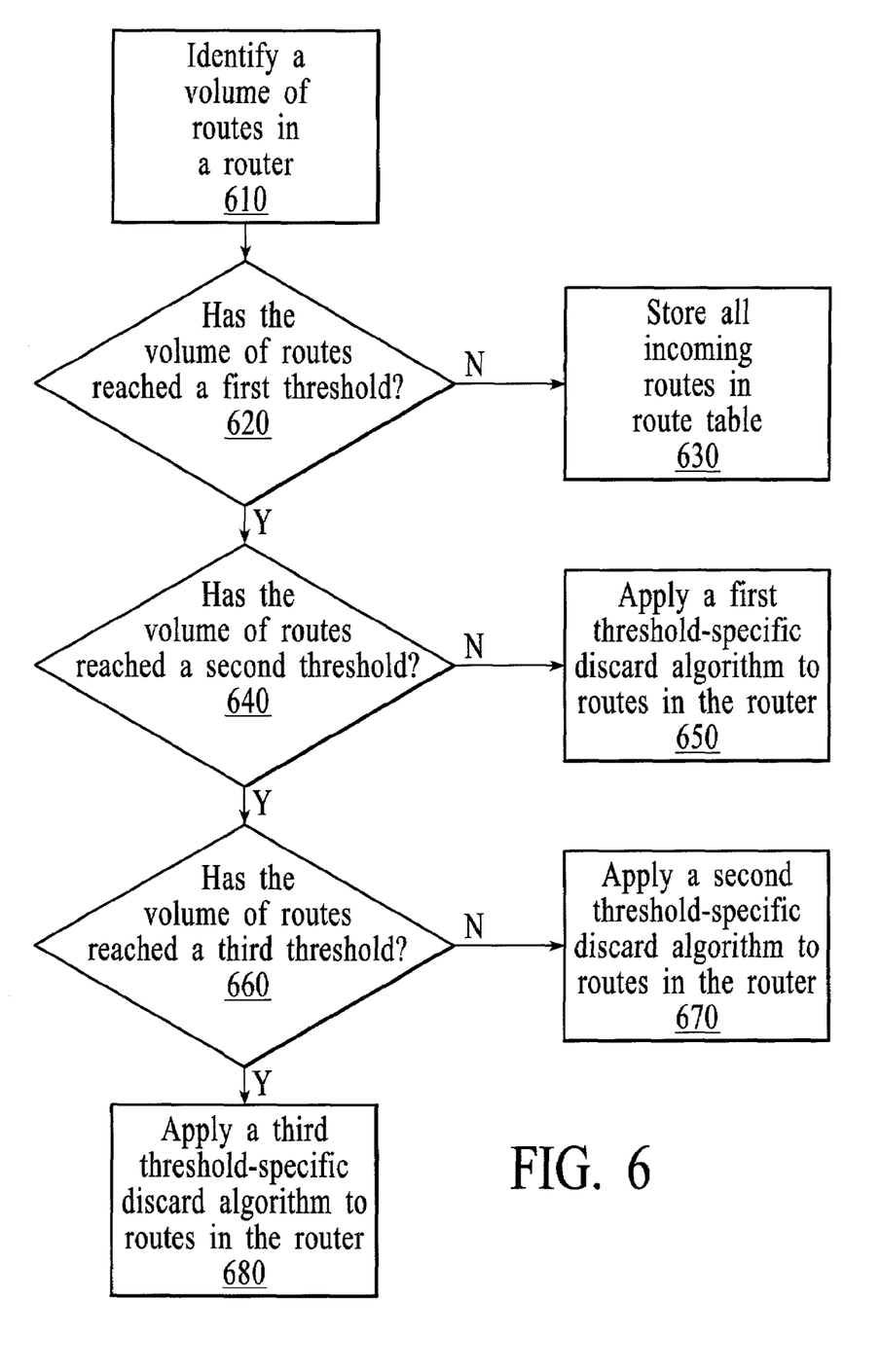
FIG. 6 depicts a flowchart of another method for managing routes in a router in accordance with another embodiment of the invention.

FIG. 6 depicts a flowchart of another method for managing routes in a router in accordance with another embodiment of the invention. The flowchart depicts a method with multiple different threshold-specific discard algorithms that correspond to the multiple different thresholds. At block 610, a volume of routes in a router is identified. At decision block 620, a determination is made as to whether the volume of routes has reached a first threshold. At block 630, if the volume of routes has not reached the first threshold, then all incoming routes are stored in a route table.

At decision block 640, if the volume of routes has reached the first threshold, then a determination is made as to whether the volume of routes has reached a second threshold. At block 650, if the volume of routes has not reached the second threshold, then a first threshold-specific discard algorithm is applied to routes in the router. At decision block 660, if the volume of routes has reached the second threshold, then a determination is made as to whether the volume of routes has reached a third threshold. At block 670, if the volume of routes has not reached the third threshold, then a second threshold-specific discard algorithm is applied to routes in the router. If the volume of routes has reached a third threshold, then a third threshold algorithm is applied at block 680. In the embodiment of FIG. 6, the third threshold-specific discard algorithm involves discarding all incoming routes.

Each threshold-specific discard algorithm specifies a set of rules for managing routes in the router once the volume of routes in the router reaches the respective threshold amount. In an embodiment, a threshold-specific discard algorithm specifies a maximum number of redundant routes that can be stored in the route table. For example, a threshold-specific discard algorithm may specify that a maximum of 3 redundant routes can be stored in the route table. Once the threshold-specific discard algorithm is applied, all redundant routes in excess of the maximum number of routes are discarded. In an embodiment, redundant routes are discarded according to route preference. That is, redundant routes are assigned a preference with reference to the other redundant routes and excess routes are deleted in preferential order starting with the least preferred redundant routes. Additionally, a threshold could be established that triggers a threshold-specific discard algorithm that discards all incoming routes.

Since redundant routes identify different routes that are assigned to the same destination, it can be appreciated that some of the routes are "preferred" over other routes based on certain route parameters. One parameter that could be utilized to determine whether one route is preferred over another route is the number of hops that a packet must take to get to from the source to the destination using a given route, wherein a smaller number of hops is preferred over a larger number of hops. Another parameter that could be utilized to determine whether one route is preferred over another route is the available bandwidth along each route, wherein a route with a higher available bandwidth is preferred over a route with a lower available bandwidth. In an embodiment, routes are stored (listed) in the route table in a preferred order such that the least preferred redundant routes are stored at the bottom of the set of redundant routes and the most preferred redundant routes are at the top of the set of redundant routes. Based on the maximum number of allowed redundant routes, the least preferred routes are discarded from the router. Although the above-described parameters include a number of hops between the source and the destination and the amount of available bandwidth of each route, one of ordinary skill in the art will readily recognize that a variety of different parameters could be utilized to determine whether one route is preferred over another route while remaining within the spirit and scope of the present invention.

Figure 7:
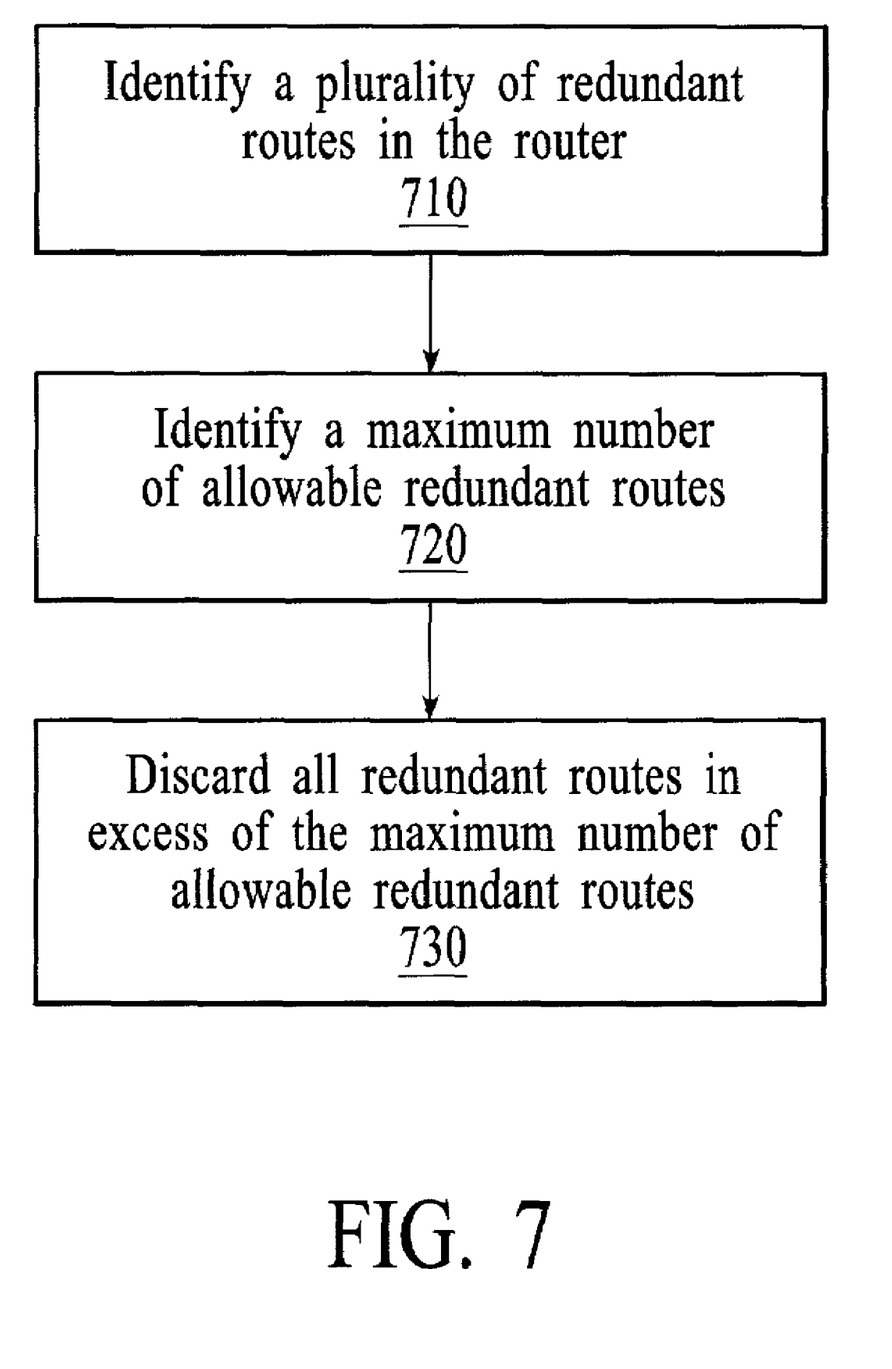
FIG. 7 depicts a flowchart of an example of a threshold-specific discard algorithm in accordance with an embodiment of the invention.

FIG. 7 depicts a flowchart of an example of a threshold-specific discard algorithm in accordance with an embodiment of the invention. At block 710, a plurality of redundant routes are identified in the router. In an embodiment, this step is initiated once the volume of routes reaches a predetermined threshold. At block 720, a maximum number of allowable redundant routes is identified. At block 730, all redundant routes in excess of the maximum number of allowable redundant routes are discarded.

It is further contemplated that different threshold-specific discard algorithms can be utilized for different routing protocols. For instance, the threshold-specific discard algorithms that are utilized to discard Border Gateway Protocol (BGP) routes could be different than the threshold-specific discard algorithms that are utilized to discard Routing Information Protocol (RIP) routes. For example, a first set of thresholds and corresponding threshold-specific discard algorithms could be applied to BGP routes in the router while a second set of thresholds and threshold-specific discard algorithms could be applied to RIP routes in the router. In light of this, one of ordinary skill in the art will appreciate that the techniques for discarding routes can be applied to routes that are generated using a variety of different protocols while remaining within the spirit and scope of the present invention.

Figure 8:
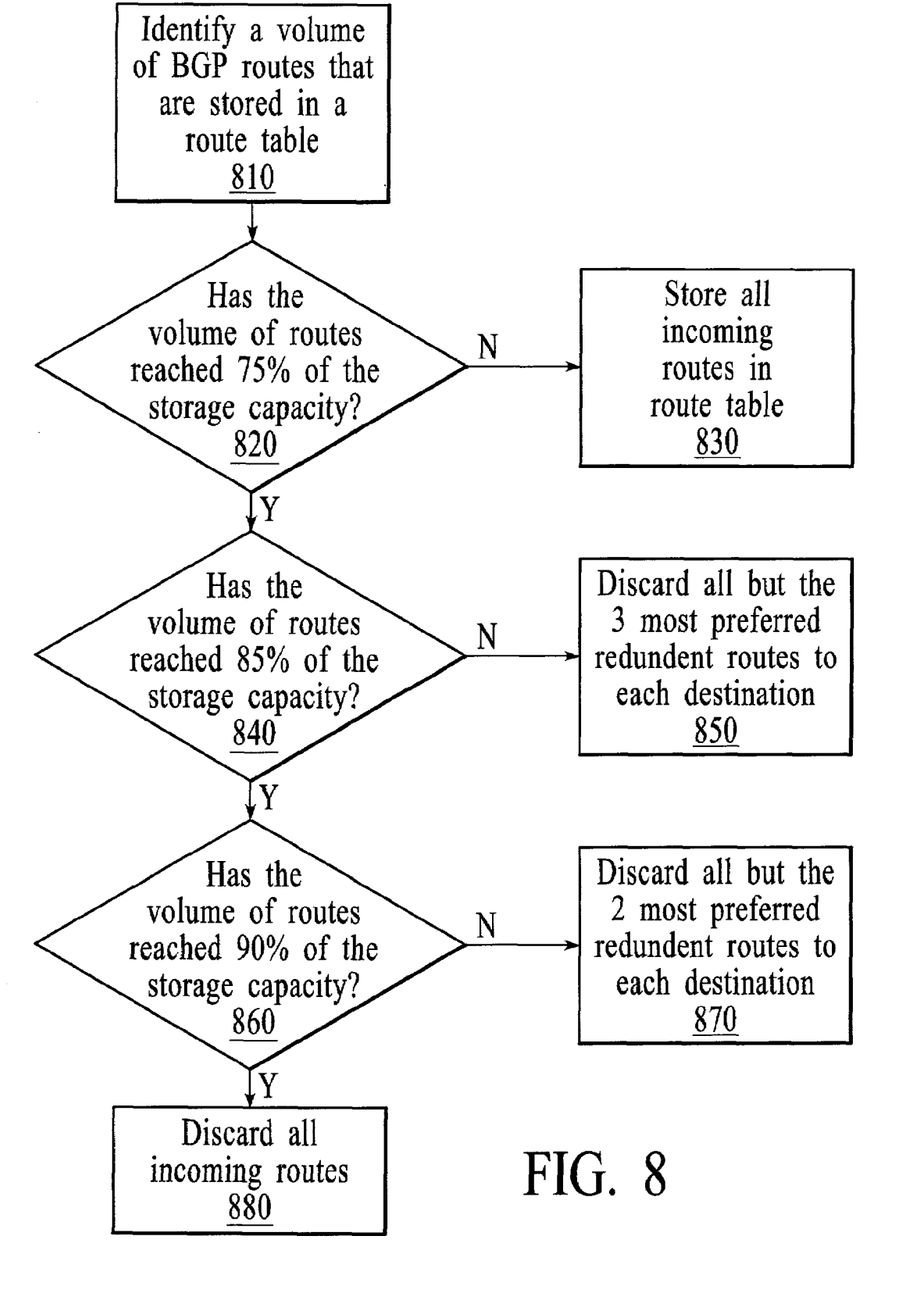
FIG. 8 depicts a flowchart of another method for managing routes in a router in accordance with another embodiment of the invention.

FIG. 8 is a flowchart of another method for managing routes in a router in accordance with an embodiment of the invention. The flowchart of FIG. 8 depicts an example method with specified threshold volumes and specified threshold-specific discard algorithms. At block 810, a volume of BGP routes being stored in a route table is identified. At decision block 820, a determination is made as to whether the volume of stored routes has reached 75% of the storage capacity. At block 830, if the volume of stored routes has not reached 75% of the storage capacity, then all incoming routes are stored in a route table.

If the volume of routes has reached 75% of the storage capacity, then a determination is made as to whether the volume of routes has reached 85% of the storage capacity at decision block 840. At block 850, if the volume of routes has not reached 85% of the storage capacity, then all redundant routes to each given destination are discarded except the three most preferred routes. In an embodiment, this step involves identifying the three most preferred redundant routes to each destination in the route table and discarding all other redundant routes to that destination.

If the volume of routes has reached 85% of the storage capacity, then a determination is made as to whether the volume of routes has reached 90% of the storage capacity at decision block 860. If the volume of routes has not reached 90% of the storage capacity, then all routes to each given destination are discarded except the two most preferred routes at block 870. In an embodiment, this step involves identifying the two most preferred redundant routes to each destination in the route table and discarding all other routes to that destination. At block 880, if the volume of routes has reached 90% of the storage capacity, then all incoming routes are discarded from the route table.

While the invention is described in the general context of an application program that runs on an operating system in conjunction with a personal computer and in connection with a server, those skilled in the art will recognize that the invention also may be implemented in combination with other program modules. Generally, program modules include routines, operating systems, application programs, components, data structures, etc. that perform particular tasks or implement particular abstract data types. Moreover, those skilled in the art will appreciate that the invention may be practiced with other computer system configurations, including hand-held devices, multiprocessor systems, microprocessor-based or programmable consumer electronics, minicomputers, mainframe computers, and the like.

The present invention may also be implemented, for example, by operating a computer system to execute a sequence of machine-readable instructions. The instructions may reside in various types of computer readable media. In this respect, another aspect of the present invention concerns a programmed product, comprising computer readable media tangibly embodying a program of machine readable instructions executable by a digital data processor to perform a method for discarding routes from a router.

This computer readable media may comprise, for example, RAM (not shown) contained within the system. Alternatively, the instructions may be contained in another computer readable media such as a magnetic data storage diskette and directly or indirectly accessed by the computer system. Whether contained in the computer system or elsewhere, the instructions may be stored on a variety of machine readable storage media, such as a DASD storage (e.g. a conventional "hard drive" or a RAID array), magnetic tape, electronic read-only memory, an optical storage device (e.g., CD ROM, WORM, DVD, digital optical tape), or other suitable computer readable storage media. In an illustrative embodiment of the invention, the machine-readable instructions may comprise lines of compiled C, C++, or similar language code commonly used by those skilled in the programming for this type of application arts.

A method and system for managing routes in a router is disclosed. The method and system involves the implementation of threshold-specific discard algorithms to discard redundant routes in an intelligent fashion based upon the volume of routes in the router. By employing threshold-specific discard algorithms to intelligently discard redundant routes within a router, the storage capacity of the router is utilized in a more efficient fashion because the routes are not dropped indiscriminately.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A method for managing routes in a router comprising the steps of:
   identifying a volume of routes in the router, wherein the routes define multiple-hop paths to forward data packets from a source router to a destination router using a router table lookup at each router location;
   determining whether the volume of routes has reached a threshold, wherein the threshold is a predetermined fraction of less than 90% of the router storage capacity; and
   applying a threshold-specific discard algorithm to redundant routes in the router if the volume of routes has reached the threshold, wherein applying the threshold-specific discard algorithm comprises identifying a maximum number of redundant routes and discarding all redundant routes in excess of the maximum number of redundant routes.

2. The method of claim 1 wherein applying the threshold-specific discard algorithm includes applying the threshold-specific discard algorithm to routes that are stored in a route table.

3. The method of claim 1 wherein applying the threshold-specific discard algorithm includes applying the threshold-specific discard algorithm to incoming routes.

4. The method of claim 3 further comprising:
   storing the incoming routes in a route table if the volume of routes has not reached the threshold.

5. The method of claim 1 further comprising:
   determining whether the volume of routes has reached another threshold; and
   applying a second threshold-specific discard algorithm to the routes if the volume of routes has reached the other threshold.

6. The method of claim 5 further comprising:
   storing the routes in a route table if the volume of routes has not reached the other threshold.

7. The method of claim 1 wherein the threshold is defined as a fraction of the router storage capacity in the router.

8. The method of claim 1 wherein the threshold is defined as a number of routes being stored in the router.

9. The method of claim 1 wherein the threshold-specific discard algorithm is a function of a routing protocol.

10. The method of claim 1 wherein a first maximum number of routes are allowed to a given destination for a first threshold.

11. The method of claim 10 wherein a second maximum number of routes are allowed to the given destination for a second threshold.

12. The method of claim 1, wherein applying the threshold-specific discard algorithm comprises discarding a lower preferred route from the router and keeping a more preferred route in the router.

13. The method of claim 12, wherein the more preferred route comprises a fewer number of packet hops from a source to a destination than the less preferred route.

14. The method of claim 13, wherein the more preferred route comprises a higher available bandwidth than the less preferred route.

15. The method of claim 1 wherein the threshold is defined as a number of routes stored in a combination of a routing table and a routing buffer.

16. A system for managing routes in a router comprising:
   means for identifying a volume of routes in the router, wherein the routes define multiple-hop paths to forward data packets from a source router to a destination router using a router table lookup at each router location;
   means for determining whether the volume of routes has reached a threshold, wherein the threshold is a predetermined fraction of less than 90% of the router storage capacity; and
   means for applying a threshold-specific discard algorithm to redundant routes in the router if the volume of routes has reached the threshold, wherein the means for applying the threshold-specific discard algorithm comprises means for identifying a maximum number of redundant routes and means for discarding all redundant routes in excess of the maximum number of redundant routes.

17. The system of claim 16 wherein the means for applying the threshold-specific discard algorithm includes means for applying the threshold-specific discard algorithm to routes that are stored in a route table.

18. The system of claim 16 wherein the means for applying the threshold-specific discard algorithm includes means for applying the threshold-specific discard algorithm to incoming routes.

19. The system of claim 18 further comprising:
means for storing the incoming routes in a route table if the volume of routes has not reached the threshold.

20. The system of claim 16 further comprising:
means for determining whether the volume of routes has reached another threshold; and
means for applying a second threshold-specific discard algorithm to the routes if the volume of routes has reached the other threshold.

21. The system of claim 20 further comprising:
means for storing the routes in a route table if the volume of routes has not reached the other threshold.

22. The system of claim 16 wherein the threshold is defined as a fraction of the router storage capacity in the router.

23. The system of claim 16 wherein the threshold is defined as a number of routes being stored in the router.

24. The system of claim 16 wherein the threshold-specific discard algorithm is a function of a routing protocol.

25. The system of claim 16 wherein a first maximum number of routes are allowed to a given destination for a first threshold.

26. The system of claim 25 wherein a second maximum number of routes are allowed to the given destination for a second threshold.

27. The system of claim 16 wherein the threshold is defined as a number of routes stored in a combination of a routing table and a routing buffer.

28. A non-transitory computer readable storage medium comprising program instructions for managing routes in a router, the program instructions comprising the steps of:
identifying a volume of routes in the router, wherein the routes define multiple-hop paths to forward data packets from a source router to a destination router using a router table lookup at each router location;
determining whether the volume of routes has reached a threshold, wherein the threshold is a predetermined fraction of less than 90% of the router storage capacity; and
applying a threshold-specific discard algorithm to redundant routes in the router if the volume of routes has reached the threshold, wherein applying the threshold-specific discard algorithm comprises identifying a maximum number of redundant routes and discarding all redundant routes in excess of the maximum number of redundant routes.

29. The non-transitory computer readable storage medium of claim 28 wherein applying the threshold-specific discard algorithm includes applying the threshold-specific discard algorithm to routes that are stored in a route table.

30. The non-transitory computer readable storage medium of claim 28 wherein applying the threshold-specific discard algorithm includes applying the threshold-specific discard algorithm to incoming routes.

31. The non-transitory computer readable storage medium of claim 30 further comprising:
storing the incoming routes in a route table if the volume of routes has not reached the threshold.

32. The non-transitory computer readable storage medium of claim 28 further comprising:
determining whether the volume of routes has reached another threshold; and
applying a second threshold-specific discard algorithm to the routes if the volume of routes has reached the other threshold.

33. The non-transitory computer readable storage medium of claim 32 further comprising:
storing the routes in a route table if the volume of routes has not reached the other threshold.

34. The non-transitory computer readable storage medium of claim 28 wherein the threshold is defined as a fraction of the router storage capacity in the router.

35. The non-transitory computer readable storage medium of claim 28 wherein the threshold is defined as a number of routes being stored in the router.

36. The non-transitory computer readable storage medium of claim 28 wherein the threshold-specific discard algorithm is a function of a routing protocol.

37. The non-transitory computer readable storage medium of claim 28 wherein a first maximum number of routes are allowed to a given destination for a first threshold.

38. The non-transitory computer readable storage medium of claim 37 wherein a second maximum number of routes are allowed to the given destination for a second threshold.

39. The non-transitory computer readable storage medium of claim 28 wherein the threshold is defined as a number of routes stored in a combination of a routing table and a routing buffer.

40. A router for use in a computer network comprising:
a buffer;
a route table to store a plurality of routes, wherein the routes define multiple-hop paths to forward data packets from a source router to a destination router using a router table lookup at each router location; and
route discard logic coupled to the buffer and the route table wherein the route discard logic comprises logic for:
identifying a volume of routes in the router;
determining whether the volume of routes has reached a threshold, wherein the threshold is a predetermined fraction of less than 90% of the router storage capacity; and
applying a threshold-specific discard algorithm to redundant routes in the router if the volume of routes has reached the threshold, wherein applying the threshold-specific discard algorithm comprises identifying a maximum number of redundant routes and discarding all redundant routes in excess of the maximum number of redundant routes.

41. The router of claim 40 wherein the route discard logic includes logic for applying the threshold-specific discard algorithm to routes that are stored in a route table.

42. The router of claim 40 wherein the route discard logic includes logic for applying the threshold-specific discard algorithm to incoming routes.

43. The router of claim 42 wherein the route discard logic includes:
logic for storing the incoming routes in the route table if the volume of routes has not reached the threshold.

44. The router of claim 40 wherein the route discard logic includes:
determining whether the volume of routes has reached another threshold; and applying a second threshold-specific discard algorithm to the routes if the volume of routes has reached the other threshold.

45. The router of claim 44 wherein the route discard logic includes:
logic for storing the routes in the route table if the volume of routes has not reached the other threshold.

46. The router of claim 40 wherein the threshold is defined as a fraction of the router storage capacity in the router.

47. The router of claim 40 wherein the threshold is defined as a number of routes being stored in the router.

48. The router of claim 40 wherein the threshold-specific discard algorithm is a function of a routing protocol.

49. The router of claim 40 wherein a first maximum number of routes are allowed to a given destination for a first threshold.

50. The router of claim 49 wherein a second maximum number of routes are allowed to a given destination for the second threshold.

51. The router of claim 40, wherein the volume of routes in the router are stored in the route table and the buffer.

52. The router of claim 40 wherein the threshold is defined as a number of routes stored in a combination of the buffer and the route table.

* * * * *